United States Patent [19]

Sakagami et al.

[11] Patent Number: 4,578,445
[45] Date of Patent: Mar. 25, 1986

[54] HALOGEN-CONTAINING LENS MATERIAL

[75] Inventors: Teruo Sakagami; Yasufumi Fujii; Naohiro Murayama, all of Iwaki, Japan

[73] Assignee: Kureha Kagaku Kogyo Kabushiki Kaisha, Chuo, Japan

[21] Appl. No.: 716,460

[22] Filed: Mar. 27, 1985

[30] Foreign Application Priority Data

Mar. 27, 1984 [JP] Japan .................................. 59-58876

[51] Int. Cl.$^4$ ........................................... C08F 220/22
[52] U.S. Cl. .............................. 526/292.3; 526/292.5
[58] Field of Search ............... 526/292.1, 292.3, 292.4, 526/292.5, 292.6

[56] References Cited

U.S. PATENT DOCUMENTS 3,165,502  1/1965  Caldwell .......................... 526/292.1
3,210,326 10/1965  Tousignant ...................... 526/292.5
3,277,053 10/1966  Hill .
3,817,913  6/1974  Gaenzler .......................... 526/292.3

FOREIGN PATENT DOCUMENTS 49-69788 5/1974 Japan .

*Primary Examiner*—Paul R. Michl
*Attorney, Agent, or Firm*—Wenderoth, Lind & Ponack

[57] ABSTRACT

A lens material having a refractive index $n_D^{20}$ of at least 1.57 or more and an Abbé's number $\nu$ of at least 30, comprising: a copolymer comprising (I) 10 to 85% by weight of a halogen-containing monomer represented by the following formula (1), (II) 15 to 90% by weight of a halogen-containing monomer represented by the following formula (2), and (III) 0 to 20% by weight of a monomer copolymerizable with the above mentioned monomers, the composition of the copolymer being based on the total quantity of the monomers (I), (II), and (III):

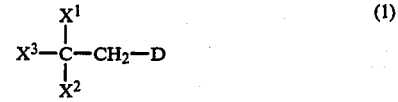

wherein: D represents

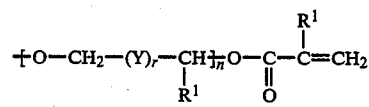

in which n represents an integer selected from the group consisting of 0, 1, and 2; each $R^1$ represents hydrogen or a methyl group; Y represents CHOH; and r represents 0 or 1; each of $X^1$ and $X^2$ represents, independently from each other, a methyl group in which one through three of the hydrogen atoms are substituted by a member selected from the group consisting of bromine, iodine and a hydroxyl group (OH group), with the proviso that the number of substitution of the OH group is only one; $X^3$ represents a methyl group in which one through three of the hydrogen atoms are substituted by a member selected from the group consisting of bromine, iodine and D, with the proviso that the number of substitution of D is only one; wherein at least one of $X^1$, $X^2$, and $X^3$ contains at least one bromine or iodine;

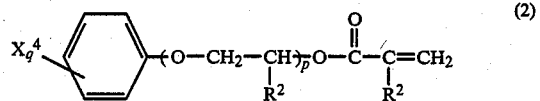

wherein: each $R^2$ represents hydrogen or a methyl group; p represents an integer selected from the group consisting of 0, 1, 2, and 3; $X^4$ represents bromine or iodine; and q represents an integer selected from the group consisting of 1, 2, 3, 4, and 5.

An example of the copolymer is 1-methacryloxy-2,2-di(bromomethyl)-3-bromopropane/methacryloxypolyethyoxy-2,4,6-tribromobenzene/styrene/divinylbenzene having a $n_D^{20}$ of 1.596 and a $\nu$ of 35.3.

5 Claims, No Drawings

HALOGEN-CONTAINING LENS MATERIAL

BACKGROUND OF THE INVENTION

The present invention relates to a novel lens material. More specifically, it relates to a halogen-containing lens having a high refractive index and a low dispersion.

Various inorganic glass lenses have been conventionally used in optical instruments and devices. Plastic lenses however are beginning to be widely used together with inorganic glass lenses because of their light weight, workability, stability, dyeability, mass productivity, possibility of low cost, etc.

Of the physical properties required of lenses, a high refractive index and a low dispersion are extremely important. For example, the high refractive index of the lenses is effective not only for making compact and light weight a lens system constituting an important component in an optical instrument or device such as a microscope, a camera, a telescope, or spectacle lenses but also for keeping aberration of spherical surfaces and the like small. On the other hand, needless to say, low dispersion (high Abbé's number) of lenses is extremely important for reducing chromatic aberration.

However, in the case of plastic lenses, also, there is a tendency for high refractive index lenses to exhibit high dispersion and low refractive index lenses to exhibit low dispersion. For example, a diethyleneglycol bisallylcarbonate resin (hereinafter referred to as CR-39), which is most widely used at present as a material for spectacle plastic lenses, exhibits a very low refractive index of $n_D^{20}=1.50$. Polymethyl methacrylate which is partially used as a lens material exhibits a high Abbé's number of $\nu=60$ but a low refractive index of $n_D^{20}=1.49$ as does the CR-39. Polystyrene ($n_D^{20}=1.59$, $\nu=30.4$) and polycarbonate ($n_D^{20}=1.59$, $\nu=29.5$), which are said to have a relatively high refractive index and low dispersion, are unsatisfactory with regard to the other physical properties required of lens materials. For example, polystyrene has a poor surface hardness and solvent resistance, and the polycarbonate has a poor surface hardness and impact resistance. Further, polynaphthyl methacrylate ($n_D^{20}=1.64$) and polyvinyl naphthalene ($n_D^{20}=1.68$), which exhibit a high refractive index, have low Abbé's numbers of $\nu=24$ and $\nu=20$, respectively. All of these lens materials are accompanied by various problems.

Recently, halogen-substituted bisphenol A derivatives have been used as plastic lens material having high refractive indexes. For example, such lens materials are known from Japanese Unexamined Patent Publication Nos. 58-28117 and 57-54901. Although these halogen-substituted bisphenol A derivatives are characterized by high refractive indexes, no reference is made to this Abbé's numbers.

Accordingly, there has been a need for plastic lens materials of excellent high refractive index, low dispersion, transparency, and other important properties.

SUMMARY OF THE INVENTION

We have sought to find solutions to the above described problems and have attained this object through a specific halogen-containing copolymer.

More specifically, the lens material according to the present invention, having a refractive index $n_D^{20}$ of 1.57 or more and an Abbé's number $\nu$ of 30 or more, comprises a copolymer comprising (I) 10 to 85% by weight of a halogen-containing monomer represented by the formula (1), (II) 15 to 90% by weight of a halogen-containing monomer represented by the formula (2), and (III) 0 to 20% by weight of a monomer copolymerizable with the above-mentioned monomers, the composition of the copolymer being based on the total amount of the

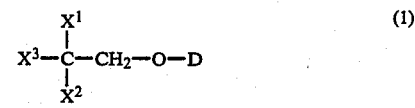

wherein: D represents

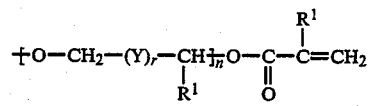

in which: n represents an integer selected from the group consisting of 0, 1 and 2; each $R^1$ represents hydrogen or a methyl group; Y represents CHOH; and r represents 0 or 1; $X^1$ and $X^2$ represent, independently from each other, a methyl group in which one through three of the hydrogen atoms are substituted by a member selected from the group consisting of bromine, iodine and a hydroxyl group (OH group), with the proviso that the number of substitution of the OH group is only one, respectively; $X^3$ represents a methyl group in which one through three of the hydrogen atoms are substituted by a member selected from the group consisting of bromine, iodine and D, with the proviso that the number of substitution of D is only one; wherein at least one of $X^1$, $X^2$ and $X^3$ contains at least one bromine or iodine;

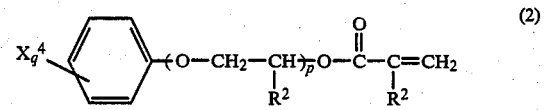

wherein: each $R^2$ represents hydrogen or a methyl group; p represents an integer selected from the group consisting of 0, 1, 2, and 3; $X^4$ represents bromine or iodine; and q represents an integer selected from the group consisting of 1, 2, 3, 4, and 5.

The homopolymer obtained from the above monomer (1) is characterized in that, in spite of its very high Abbé's number, the refractive index is not very low. The present invention has succeeded by copolymerization of the monomer (I) with the monomer (II) that has a high refractive index in obtaining a lens material which is extremely well-balanced with regard to refractive index and dispersion, i.e., has a high refractive index $n_D^{20}$ of 1.57 or more and such a low dispersion that an Abbé's number is 30 or more, such a combination of refractive index and dispersion being impossible with the conventional lens materials.

The fact that the copolymer of the present invention has the above-mentioned excellent properties as a lens material was discovered for the first time by us. This effect is based on the fact that the lens material is a copolymer comprising the monomer (I) and the monomer (II) in a total amount of 80% by weight or more.

DETAILED DESCRIPTION OF THE INVENTION

Copolymer

Monomers (I) and (II)

The components (I) and (II) of the copolymer constituting the plastic lens material of the present invention are liquid or solid monomers of the formulae (I) and (II), respectively. The monomer (I) is effective for imparting a high Abbé's number to the resultant copolymer, and the monomer (II) is effective for imparting a high refractive index to the resultant copolymer.

Now, in the formula (1) of the monomer (I), D represents

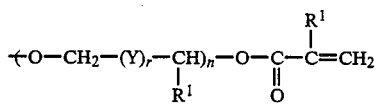

wherein: Y is CHOH; r represents the number of CHOH and is 0 or 1; $R^1$ is present in a plural number in D when n is not 0, and respectively represents hydrogen or a methyl group; and n represents an integer selected from the group consisting of 0, 1, and 2. When n represents an integer of 3 or more, the halogen content characteristic of the present invention is relatively low, resulting in a reduction in the refractive index of the copolymer. The monomer (I) may be a mixture of those in which n's are 0, 1 and/or 2, respectively.

$X^3$ represents a methyl group in which one through three of the hydrogen atoms are substituted by a member selected from the group consisting of bromine, iodine and D, with the proviso that the number of substitution of D is only one. Halogen atoms other than bromine and iodine, e.g., fluorine and chlorine, are not favorable because they produce a smaller refractive index as compared with the bromine and iodine of the present invention. The monomer (I) in which $X^3$ represents D, with the proviso that the degree of substitution is only one, is bifunctional, which causes the lens material of the present invention to have a three dimensional crosslinked structure contributing to enhancement of the solvent resistance of the material.

Each of $X^1$ and $X^2$ represents a methyl group in which one through three of the hydrogen atoms are substituted by a member selected from the group consisting of bromine, iodine and an OH group, with the proviso that the number of substitution of the OH group is only one. As the halogen atom, bromine and iodine are used because they are effective for imparting a high refractive index to the copolymer in the same sense as that described for $X^3$.

The number of bromine or iodine atoms in $X^1$, $X^2$ and $X^3$ may be varied between 1 and 3 for the purpose of obtaining the desired refractive index. Ordinarily, the number of bromine or iodine atom is preferably one. Of course, a higher refractive index can be obtained when the number of bromine or iodine atoms is two and three. The density of the resultant copolymer however increases, causing the resultant lens to be heavy. Therefore, it is preferable that number of the bromine or iodine atoms be selected from between 1 and 3 depending on the lens desired.

The introduction of the OH group into $X^1$, $X^2$ and Y is effective for improving especially the dyeability of the lens material. In the case where the lens is required to have dyeability, it is preferable that either of $X^1$, $X^2$ or Y has an OH group. Although $X^1$, $X^2$ and $X^3$ represent various substituted methyl groups as described hereinabove, at least one of these groups contains either of bromine or iodine.

Specific examples of the monomer (I) are 1-methacryloxyethoxy-2-bromomethyl-2-hydroxymethyl-3-bromopropane, 1-methacryloxy-2,2-di(bromomethyl)-3-methacryloxypropane, 1-methacryloxyethoxy-2,2-di(bromomethyl)-3=bromopropane, 1-methacryloxy-2-bromomethyl2-hydroxymethyl-3-bromopropane, 1-methacryloxy-2,2-di(bromomethyl)-3-bromopropane, 1-acryloxy-2-bromomethyl-2-hydroxymethyl-3-acryloxyethoxypropane, 1-acryloxy-2,2-di(bromomethyl)-3-bromopropane, 1-(3-methacryloxy-2-hydroxy-propoxy)-2,2-di(bromomethyl)-3-methacryloxy-propane, 1-methacryloxyethoxy-2,2-di(iodomethyl)-3-iodopropane, 1,3-di(3-methacryloxy-2-hydroxy-propoxy)-2,3-(bromomethyl)propane, 1,3-dimethacryloxy-2,2-di(bromomethyl)propane, 1,3-diacryloxyethoxy-2,2-di(bromomethyl)propane and 1-acryloxyethoxy-2,2-di(bromomethyl)-3-bromopropane, the nomenclature of the above enumerated compounds being based on the propane skeleton. The monomer (I) is not limited, of course, to these compounds. The monomer compounds may be used singly or in the form of a mixture thereof. Preferable examples of the monomer (I) are: 1-methacryloxy-2,2-di(bromomethyl)-3-bromopropane, 1-(3-methacryloxy-2-hydroxy-propoxy)- 2,2-di(bromomethyl)-3-methacryloxypropane, 1,3-dimethacryloxy-2,2-di(bromomethyl)propane, 1,3-diacryloxyethoxy -2,2-di(bromomethyl)propane and 1-acryloxyethoxy-2,2-di(bromomethyl)-3-bromopropane.

On the other hand, in the formula (2) of the monomer (II), $R^2$ is present in a plural number when p is not 0, and each represents hydrogen or a methyl group; and p represents an integer of 0 to 3. If p is more than 3, the material of the present invention tends to exhibit an undesirably low refractive index. The monomer (II) may be a mixture of those in which p's are 0, 1, 2 and/or 3 (in this case, the formula (2) may show a mixture of those in which p's are 0, 1, 2 and 3). $X^4$ represents bromine or iodine for the purpose of imparting a high refractive index to the resultant copolymer. The number q of $X^4$ has an important effect on the lens characteristics, and is an integer selected from the group consisting of 1, 2, 3, 4, and 5. The refractive index of the copolymer increases with the increase of q. However, q is selected according to the intended purpose.

Specific examples of the monomer (II) are 1-(meth)acryloxydiethoxy-p-bromobenzene, 1-(meth)acryloxyethoxy-2,4,6-tribromobenzene, 1-(meth)acryloxydiethoxy-2,4,6-tribromobenzene, 1-(meth)acryloxypolyethoxy-2,4,6-tribromobenzene, 1-(meth)acryloxy-2,4,6-tribromobenzene, 1-(meth)acryloxy-2,4,6-triiodbenzene, 1-(meth)acryloxypropoxy-2,4,6-tribromobenzene, 1-(meth)acryloxy-p-iodobenzene, 1-(meth)acryloxyethoxy-2,4,6-triiodobenzene, 1-(meth)acryloxydiethoxy-2,4,6-triiodobenzene and 1-(meth)acryloxypolyethoxy-2,4,6-triiodobenzene. (The term "poly" refers to a mixture of compounds having one, two and/or three ethylene oxide units). The monomer (II) is not limited, of course, to the above enumerated compounds. The monomer compounds may be used singly or in the form of a mixture thereof. The term "(meth)acryloxy" refers to methacryloxy or acryloxy. Preferable examples of the monomers (II) are: 1-methacryloxyethoxy-2,4,6-tribromobenzene, 1-methacryloxydiethoxy-2,4,6-tribromobenzene, 1-methacryloxypolyethoxy-2,4,6-tribromobenzene, 1-methacryloxy-2,4,6-tribromobenzene, 1-acryloxyethoxy-2,4,6-tribromobenzene, 1-acryloxydiethoxy-2,4,6-tribromobenzene, 1-acryloxypolyethoxy-2,4,6-tribromobenzene, 1-acryloxyethoxy-2,4,6-triiodobenzene, 1-acryloxydiethoxy-2,4,6-triiodobenzene, 1-acryloxypolyethoxy-2,4,6-triiodobenzene and 1-methacryloxypropyoxy-2,4,6-tribromobenzene.

The proportions of the monomer (I) and the monomer (II) are such that the monomer (I) is in the range of from 10 to 85% by weight and the monomer (II) is in the range of from 15% to 90% by weight, based on the total amount of the monomers (I), (II) and (III). The monomer (I) is necessary for obtaining a lens material having a high Abbé's number. If the amount of the monomer (I) is less than 10% by weight, only a lens material having a low Abbé's number indicating a high dispersion is obtained. The monomer (II) is necessary for obtaining a lens material having a high refractive index. If the amount of the monomer (II) is less than 15% by weight, only a lens having a low refractive index is obtained.

Monomer (III)

The lens material of the present invention basically comprises a copolymer comprising the monomer (I) and the monomer (II). However, up to 20% by weight of a copolymerizable monomer may be copolymerized with the monomers (I) and (II) under the condition that the content of the monomers (I) and (II) in the resultant copolymer be at least 80% by weight, as long as the copolymerizable monomer does not hinder the achievement of the object of attaining high refractive index and high Abbé's number of the present invention.

Examples of such a monomer are: aromatic vinyl compounds such as styrene, divinylbenzene, α-methylstyrene, and dichlorobenzene; aliphatic acrylic and methacrylic acid esters such as methyl methacrylate, butyl methacrylate, hydroxyethyl methacrylate, 2-ethylhexyl acrylate and ethylene glycol dimethacrylate; and aromatic acrylic and methacrylic acid esters such as phenyl methacrylate, α-naphthyl methacrylate and benzyl acrylate. Of course, these compounds are enumerated as examples and are not limitative. These monomers may be used singly or in the form of a mixture thereof.

In the case where the monomer (I) is one in which $X^3$ is not D, it may be preferable that, for the monomer (III), those having a plurality of ethylenical unsaturation, such as divinylbenzene and ethyleneglycol dimethacrylate, be used so as to obtain a copolymer having a crosslinking structure.

Production of the copolymers

The copolymers are produced by polymerization of the monomers.

The polymerization of a mixture of the monomer (I), the monomer (II) and, if necessary, the monomer (III), proceeds in the presence of a conventional free-radical polymerization initiator. In the case where the monomer (I) or the monomer (III) to be added in an amount of up to 20% by weight has a bifunctional polymerization functional group in the present invention, the resultant copolymer is in a crosslinked form and virtually cannot be subjected to a treatment involving melting or dissolution. Therefore, in such a case, cast polymerization is generally preferable from the viewpoint of utilizing the resultant copolymer as a lens. In the case where the copolymer has no crosslinked structure, suspension polymerization, solution polymerization and the like, in addition to the cast polymerization, may be used. The polymerization method is not especially limited to the above mentioned polymerization methods but includes all polymerization methods conventionally used.

The cast polymerization method is a well-known technique. For a cast polymerization vessel, a mold or a cell designed to produce therein the copolymer in the form of a plate, a lens, a cylinder, a square, a cone, a sphere or other shapes is used. The mold or cell can be made of any appropriate material such as inorganic glass, plastics, or metals. The polymerization can be carried out by heating, if necessary, a mixture of the monomers and the polymerization initiator which have been charged into such a vessel. Alternatively, the polymerization can be carried out according to a method in which a prepolymer or syrup obtained by polymerizing the mixture in a separate vessel to some degree is charged into the mold or cell to complete the polymerization. The required monomers and polymerization initiator may be all mixed at once or may be mixed stepwise. The mixture may contain antistatic agents, coloring matters, fillers, ultraviolet light absorbers, thermal stabilizers, antioxidants and other auxiliary materials depending upon the applications expected of the resultant copolymer.

One of the other polymerization modes according to the present invention is a method in which a mixture of the required monomers and the polymerization initiator or a prepolymer is polymerized in a suspended state in an aqueous media, i.e., suspension polymerization. This method is suitable for obtaining spherical lenses having various particle diameters. The suspension polymerization method is a well-known technique, and may be suitably carried out in the present invention according to well-known knowledge.

It is to be understood that the resultant copolymer may be subjected to post-treatments such as heating for completing the polymerization which might have been incomplete or for increasing the hardness, or annealing for eliminating strains developed in the copolymer due to cast polymerization.

Lens

The lens of the present invention is not essentially different from conventional synthetic resin lenses except that the lens material is the polymer of the present invention.

Therefore, the copolymer of the present invention can be directly obtained as a lens according to the cast polymerization method. Furthermore, the copolymer of the present invention obtained by emulsion polymerization, suspension polymerization, or the like can be subjected to various known molding processes, for example, hot press or injection molding, to produce a lens.

It is to be understood that the resultant lens can be, if necessary, subjected to conventional posttreatments such as surface polishing, antistatic treatment, multilayer coating, hard coating, dyeing or the like.

EXPERIMENTAL EXAMPLES

Throughout the following Examples, quantities expressed in percentages (%) and "parts" are by weight.

EXAMPLE 1

A mixture of 25% of 1-methacryloxy-2,2-di(bromomethyl)-3-bromopropane, 60% of 1-methacryloxypolyethoxy2,4,6-tribromobenzene (the term "poly" refers to a mixture of compounds having one, two and three ethylene oxide units, respectively, and in which the average of the ethylene oxide units is 2.2), 10% of styrene and 5% of commercially available divinylbenzene (the content is 57%) was mixed in a glass vessel with lauroyl peroxide as a polymerization initiator in an amount of 0.5 parts per 100 parts of the sum of the monomers. Thereafter, the atmosphere within the glass vessel was replaced with $N_2$. Then, bulk polymerization was carried out in the glass vessel. The polymerization conditions were 60° C./16 hours, 100° C./1 hour, and 110° C./1 hour.

The optical physical properties of the resultant copolymer were as follows.

| Refractive index | $n_D^{20}$ = 1.596 |
|---|---|
| Abbe's number | $\nu$ = 35.3 |

Thus, the copolymer of this example was a useful material having a combination of a high refractive index and a high Abbé's number. Furthermore, the copolymer had a good transparency. Therefore, the copolymer was favorable as a lens.

EXAMPLE 2

20% of the same 1-methacryloxy-2,2-di(bromomethyl)-3-bromopropane as used in Example 1, 65% of 1-methacryloxy-2,4,6-tribromobenzene, 10% of styrene and 5% of ethyleneglycol dimethacrylate were mixed. The mixture was subjected to bulk polymerization under substantially the same conditions as in Example 1.

The optical physical properties of the resultant copolymer are shown hereunder.

| Refractive index | $n_D^{20}$ = 1.613 |
|---|---|
| Abbe's number | $\nu$ = 32.7 |

Thus, a lens material having a high refractive index and a high Abbé's number was obtained.

EXAMPLE 3

70% of 1-methacryloxy-2,4,6-tribromobenzene and 30% of 1-(3methacryloxy-2-hydroxypropoxy)-2,2-di(bromomethyl)-3-methacryloxypropane of the formula:

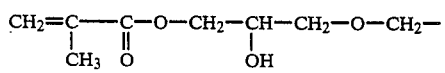
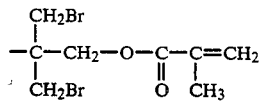

were mixed in a glass vessel. Lauroyl peroxide was added to the mixture in an amount of 0.6 part per 100 parts of the sum of the monomers. Thereafter, the atmosphere within the glass vessel was replaced with $N_2$. Then, the bulk polymerization was carried out in the glass vessel. The mixture was heated at 60° C. for 3 hours, 80° C. for 16 hours, 100° C. for 1 hour and 110° C. for 1 hour to complete the polymerization.

The resultant copolymer was measured at 20° C. by using an Abbé's refractometer. The refractive index and Abbé's number were as follows.

| Refractive index | $n_D^{20}$ = 1.605 |
|---|---|
| Abbe's number | $\nu$ = 34 |

Thus, the copolymer obtained in this example was a useful lens material having a combination of extremely high refractive index and Abbé3 s number. Furthermore, a lens consisting of this copolymer had excellent transparency.

EXAMPLE 4

20% of 1-(3-methacryloxy-2-hydroxypropoxy)-2,2-di(bromomethyl)- -3-methacryloxypropane, 62% of 1-methacryloxy-2,4,6-tribromobenzene and 18% of styrene were mixed in a glass vessel. Lauroyl peroxide, as a polymerization initiator, was added to the mixture in an amount of 0.5 part per 100 parts of the sum of the monomers. After the atmosphere within the glass vessel was replaced with $N_2$, the bulk polymerization was carried out. The polymerization conditions were 60° C./16 hours, 100° C./1 hour and 110° C./1 hour.

The resultant copolymer was transparent and had a high refractive index and Abbé's number as set forth below. Hence, this copolymer was useful as a lens material.

| Refractive index | $n_D^{20}$ = 1.61 |
|---|---|
| Abbe's number | $\nu$ = 32.5 |

We claim:

1. A lens having a refractive index $n_D^{20}$ of at least 1.57 and an Abbé's number $\nu$ of at least 30 or more, which lens is made of a copolymer comprising: a copolymer comprising 10 to 85% by weight of a halogen-containing monomer (I) represented by the formula (1) set forth below, 15 to 90% by weight of a halogen-containing monomer (II) represented by the formula (2) set forth below, and 0 to 20% by weight of a monomer (III) copolymerizable with the above-mentioned monomers, the composition of the copolymer being based on the total quantity of the monomers (I), (II), and (III):

wherein D represents

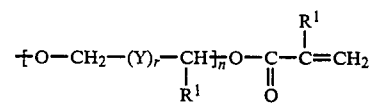

in which: n represents an integer selected from the group consisting of 0, 1, and 2; each $R^1$ represents hydrogen or a methyl group; Y represents CHOH; and r represents 0 or 1; each of $X^1$ and $X^2$ represents, independently from each other, a methyl group in which one through three of the hydrogen atoms are substituted by a number selected from the group consisting of bromine, iodine and a hydroxyl group (OH group), with the proviso that the number of substitution of the OH group is only one; $X^3$ represents a methyl group in which one through three of the hydrogen atoms are substituted by a member selected from the group consisting of bromine, iodine and D, with the proviso that the number of substitution of D is only one; wherein at least one of $X^1$, $X^2$, and $X^3$ contains at least one bromine or iodine atom;

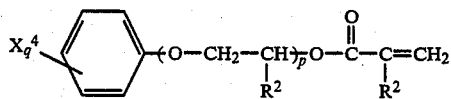

wherein each $R^2$ represents hydrogen or a methyl group; p represents an integer selected from the group consisting of 0, 1, 2, and 3; $X^4$ represents bromine or iodine; and q represents an integer selected from the group consisting of 1, 2, 3, 4, and 5.

2. A lens material as claimed in claim 1, wherein the monomer (I) is selected from the group consisting of 1-methacryloxy-2,2-di(bromomethyl)-3-bromopropane, 1-(3-methacryloxy-2-hydroxy-propoxy)-2,2-di(-bromomethyl)-3-methacryloxypropane, 1,3-dimethacryloxy-2,2-di(bromomethyl)propane, 1,3-diacryloxyethoxy-2,2-di(bromomethyl)propane and 1-acryloxyethoxy-2,2-di(bromomethyl)-3-bromopropane.

3. A lens material as claimed in claim 1, wherein the monomer (II) is selected from the group consisting of 1-methacryloxyethoxy-2,4,6-tribromobenzene, 1-methacryloxydiethoxy-2,4,6-tribromobenzene, 1-methacryloxypolyethoxy-2,4,6-tribromobenzene, 1-methacryloxy-2,4,6-tribromobenzene, 1-acryloxyethoxy-2,4,6-tribromobenzene, 1-acryloxydiethoxy-2,4,6-tribromobenzene, 1-acryloxypolyethoxy-2,4,6-tribromobenzene, 1-acryloxyethoxy-2,4,6-triiodobenzene, 1-acryloxydiethoxy-2,4,6-triiodobenzene, 1-acryloxypolyethoxy-2,4,6-triiodobenzene and 1-methacryloxypropyoxy-2,4,6-tribromobenzene.

4. A lens material as claimed in claim 1, wherein the monomer (I) is a halogen-containing monomer of the formula (1) in which $X^3$ represents no D, and the monomer (III) is a comonomer having a plurality of ethylenical unsaturation.

5. A lens material as claimed in claim 1, wherein the monomer (I) is a halogen-containing monomer of the formula in which $X^3$ represents D, and the monomer (III) is a comonomer having no plurality of ethylenical unsaturation.

* * * * *